J. KAYETAN & H. EVENSON.
RAZOR HONING MACHINE.
APPLICATION FILED MAR. 1, 1915.

1,217,608.

Patented Feb. 27, 1917.
6 SHEETS—SHEET 1.

Witnesses
Otto E. Roddick
John B. Eads

Inventors
John Kayetan & Henry Evenson
By
Attorney

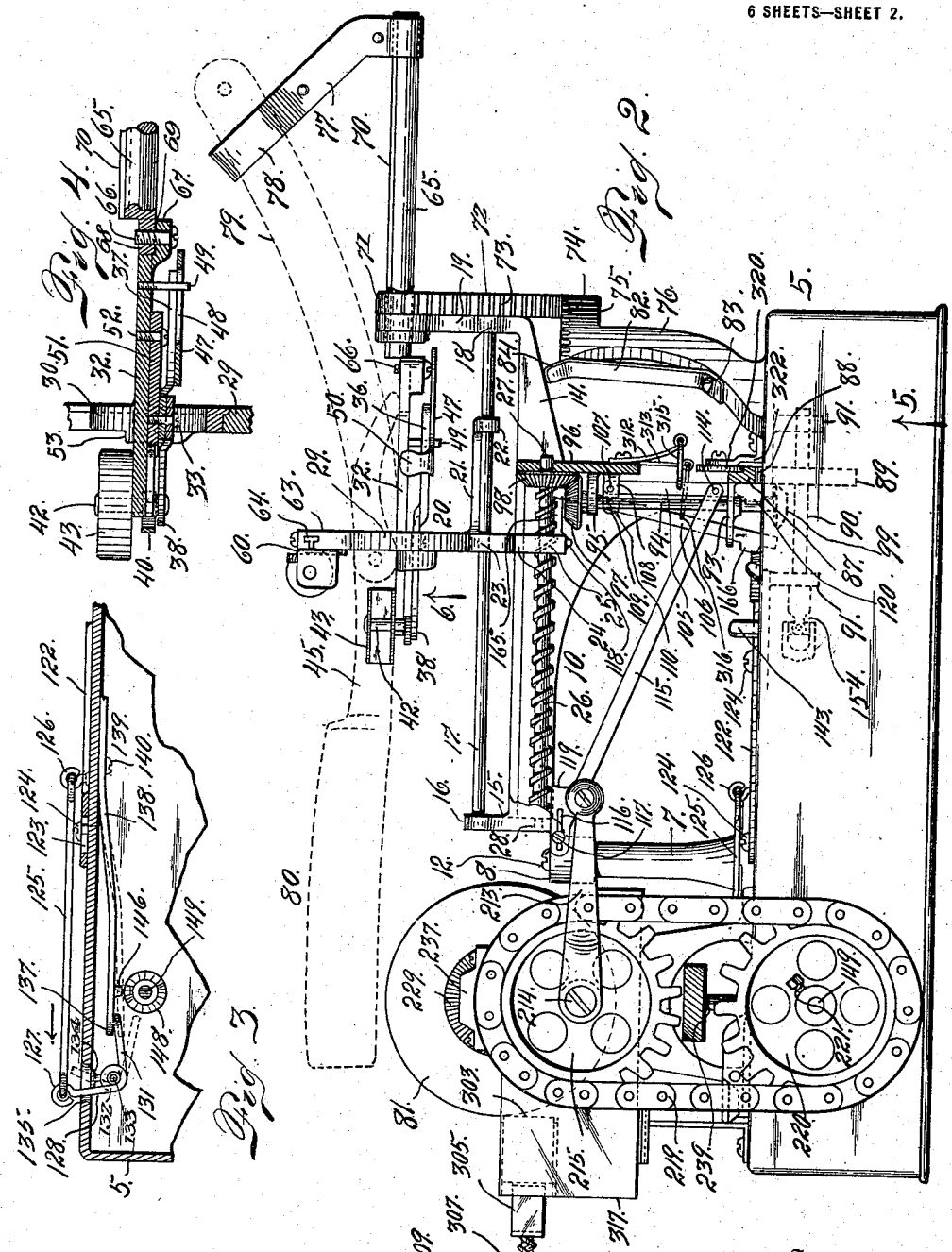

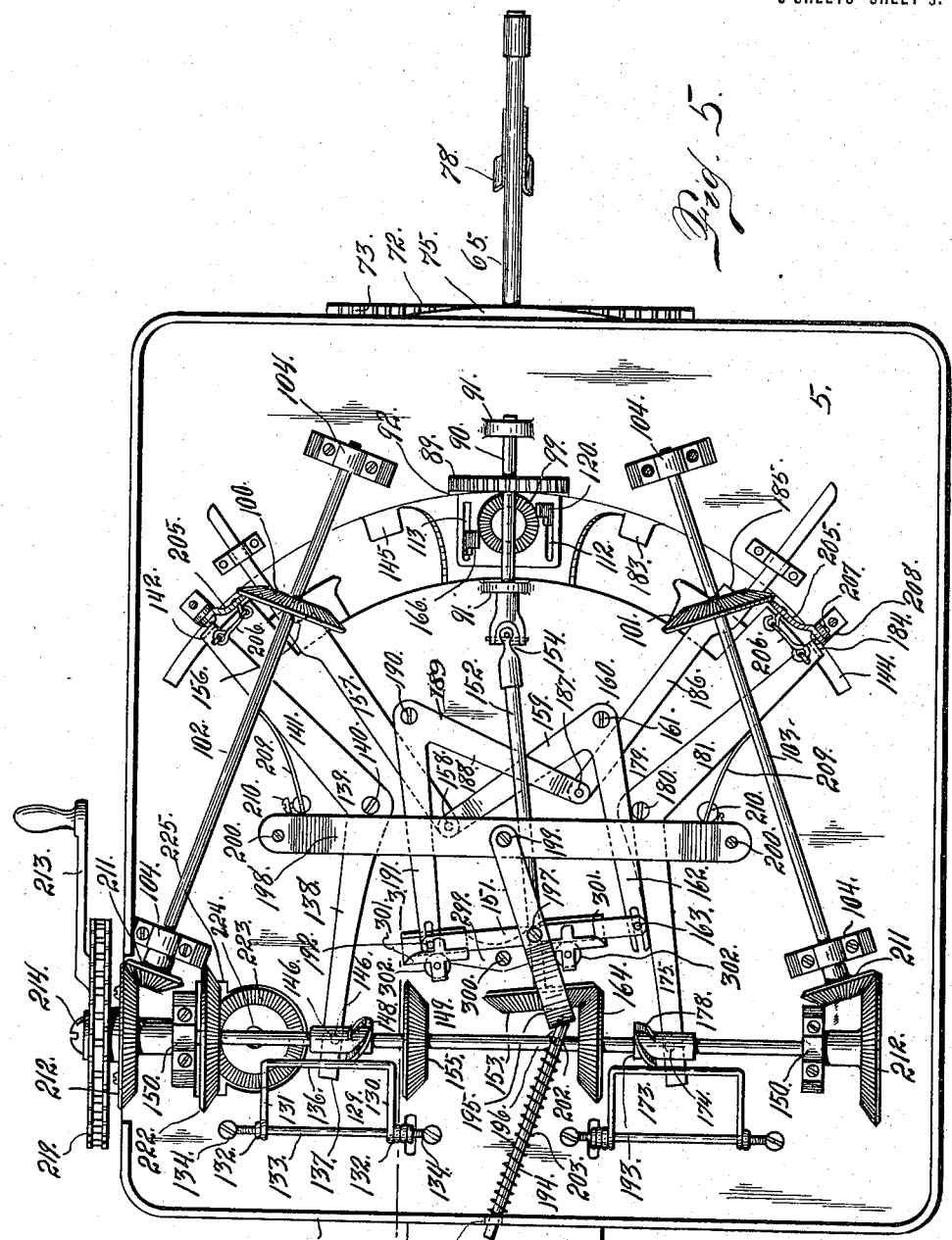

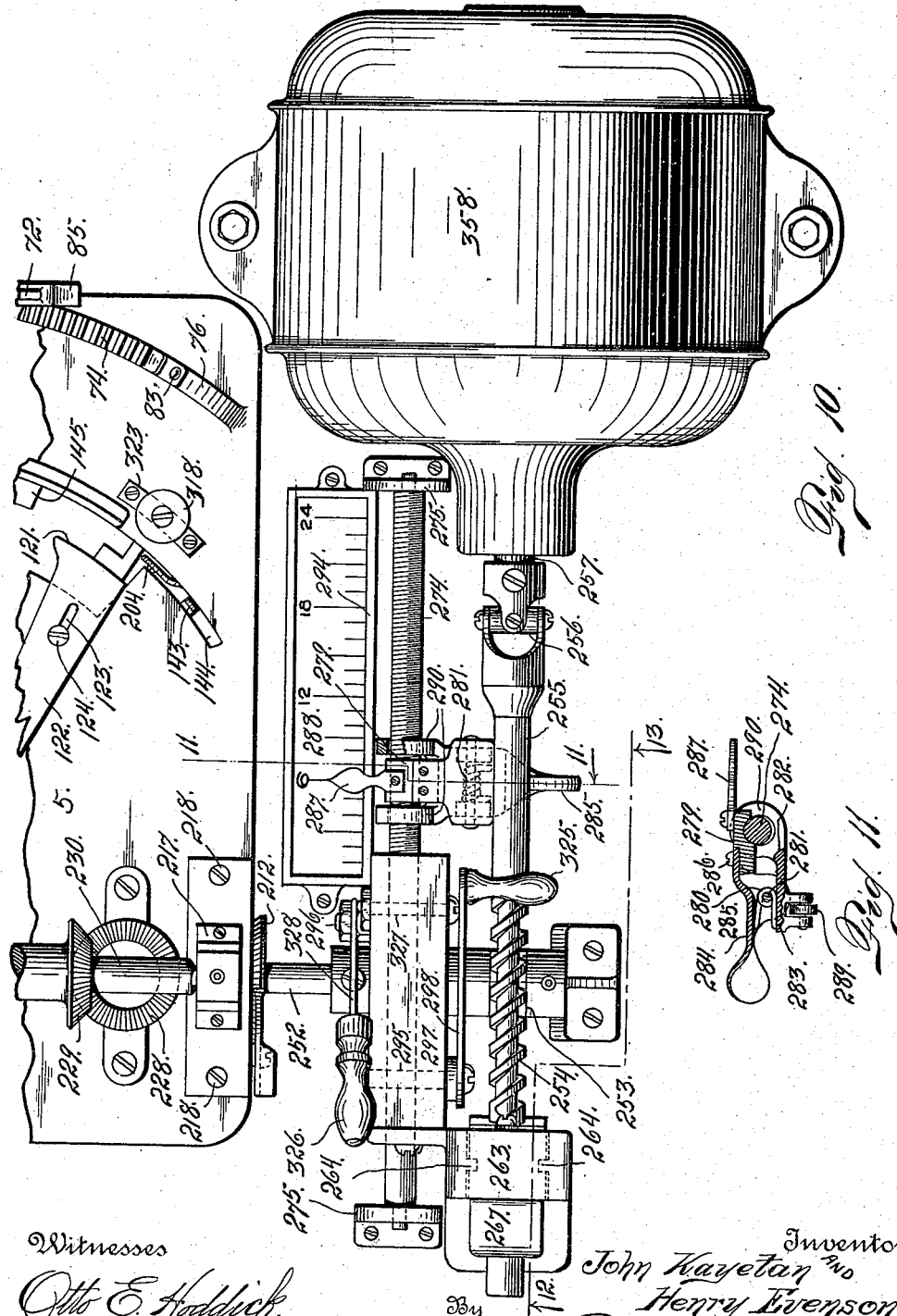

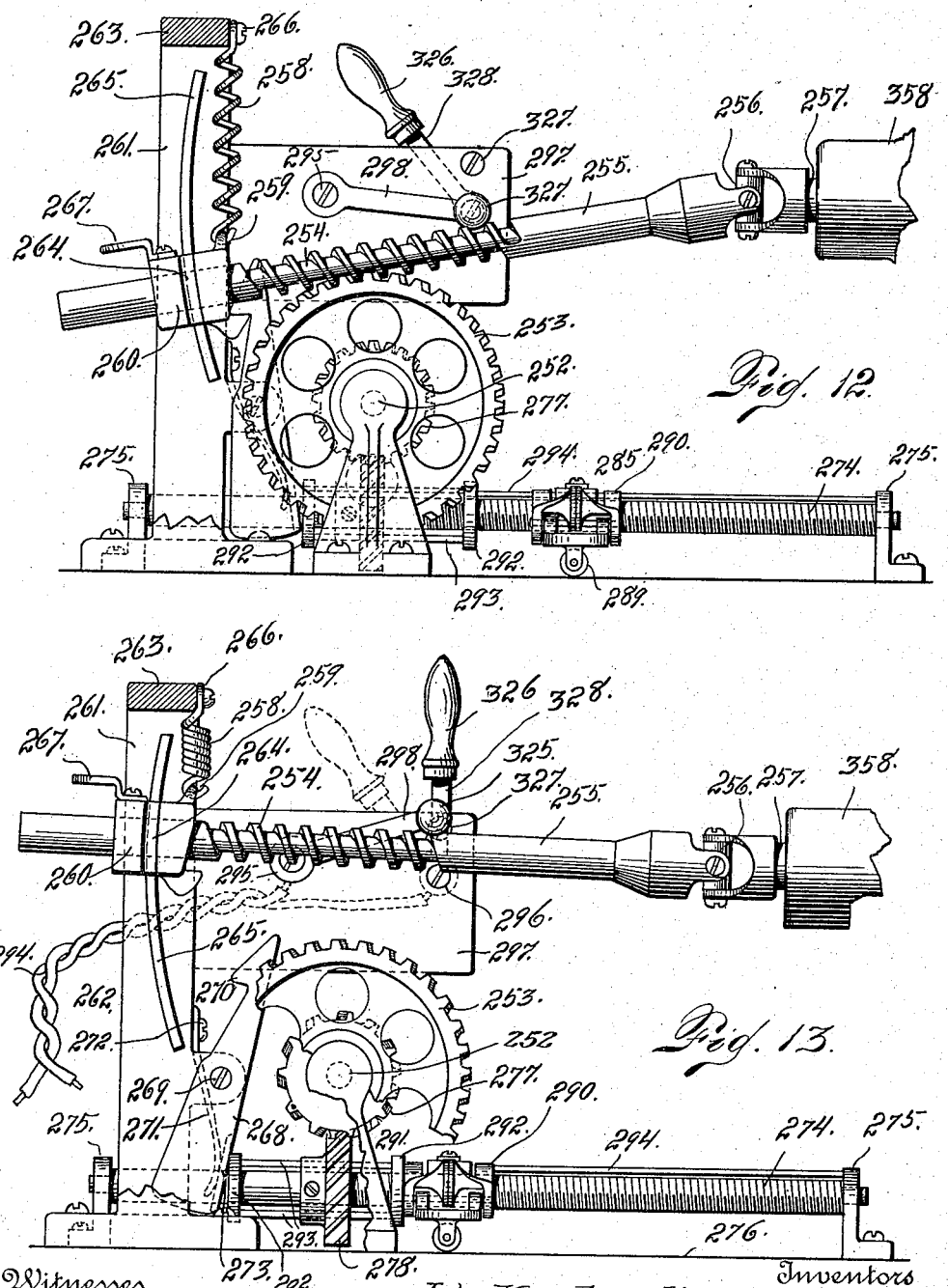

UNITED STATES PATENT OFFICE.

JOHN KAYETAN, OF NEW YORK, N. Y., AND HENRY EVENSON, OF WHEAT RIDGE, COLORADO, ASSIGNORS TO KAYETAN-RUES COMPANY, INC., A CORPORATION OF NEW YORK.

RAZOR-HONING MACHINE.

1,217,608.  Specification of Letters Patent.  Patented Feb. 27, 1917.

Application filed March 1, 1915. Serial No. 11,162.

*To all whom it may concern:*

Be it known that we, JOHN KAYETAN and HENRY EVENSON, citizens of the United States, residing at New York, county of New York, State of New York, and Wheat Ridge, Jefferson county, State of Colorado, respectively, have invented certain new and useful Improvements in Razor-Honing Machines; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in razor honing machines, our object being to provide a construction of this class which shall be entirely automatic in its action, if desired. The purely automatic machine is operated by a motor and in this event, the only manual requirement is that the razor shall be put in position within the holder with which the machine is provided, and the current turned on through the motor. This having been done, the machine is put in motion and the razor honing or sharpening operation continues for the required period, which is predetermined by means of an adjustable gage which includes a traveling member which serves when the machine has operated for the required length of time, to automatically break the connection between the motor and the operating mechanism of the machine.

The machine may, however, be manually operated, so far as applying the power is concerned. In this event, it operates precisely as the entirely automatic machine, except as to the application of the power both for starting and stopping purposes.

Having briefly outlined our improved construction, we will proceed to describe the same in detail, reference being made to the accompanying drawing, in which is illustrated an embodiment thereof. In this drawing,—

Fig. 2 is a side elevation of the same, or a view looking in the direction of arrow 2, Fig. 1.

Fig. 3 is a fragmentary sectional view, the section being taken on the line 3—3, Fig. 5.

Fig. 4 is a fragmentary sectional view taken through the clamp of the razor holder on the line 4—4, Fig. 6.

Fig. 5 is an underneath view of the machine, or a view looking in the direction of arrow 5, Fig. 2, being a view disclosing most of the operating mechanism which is normally concealed within the housing structure. This view shows the mechanism within the said housing and underneath the top plate thereof, while Fig. 1 shows the mechanism exposed, looking downwardly upon said base.

Fig. 10 is a fragmentary top plan view of the machine, illustrating the motor driven structure and showing the side of the machine where the motor and its connections are located, a large portion of the opposite side of the machine being broken away for lack of room on the sheet.

Fig. 11 is a cross section taken on the line 11—11, Fig. 10, looking toward the left.

Figure 1:
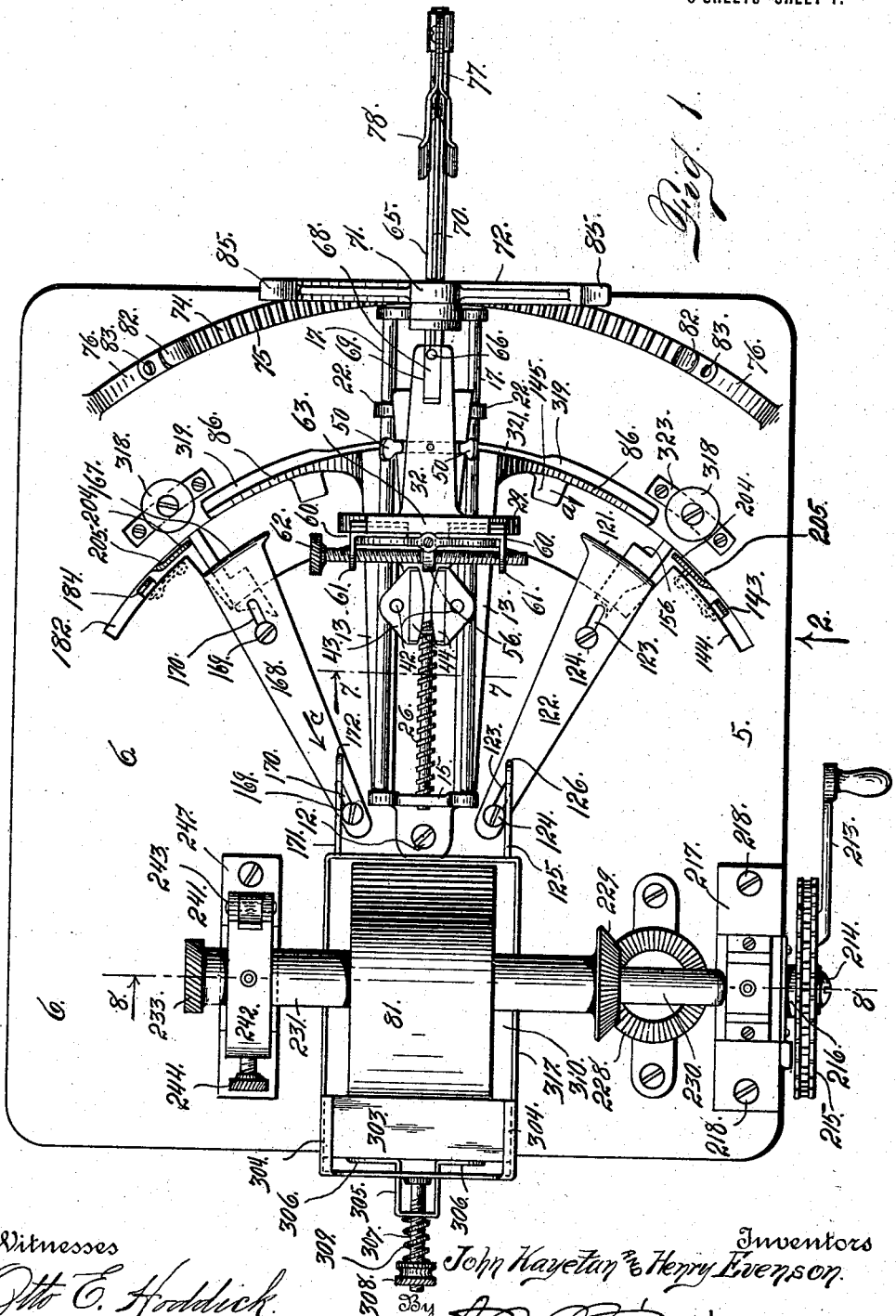
Figure 1 is a top plan view of the machine constructed for manual operation by the employment of a crank.
Figure 6:
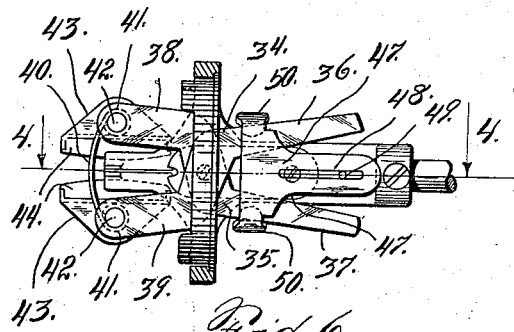
Fig. 6 is an underneath view of the clamping member of the razor holder, or a view looking in the direction of arrow 6, Fig. 2.

Fig. 12 is a fragmentary side elevation of the mechanism, looking toward the motor side of the machine and showing the parts connected in operative relation with the motor shaft or armature. This view may be termed a sectional view taken on the line 12—13, Fig. 10, viewed in the direction of the arrow. While no parts are shown technically in section, the equivalent result is obtained by breaking away a portion of the structure. In this view the operating worm shaft member connected with the motor armature is in engagement with its coöperating worm wheel, whereby the machine is motor-driven.

Fig. 13 is a similar view but showing the worm of the worm shaft disconnected from the worm wheel, or the position of this portion of the machine when the operation ceases automatically through the instrumentality of the traveling member with which the gage is equipped.

The same reference characters indicate the same parts in all the views.

Let the numeral 5 designate the base of the machine which consists of a housing of such height as to inclose a large part of the operating mechanism of the machine, the part concealed therein being approximately all of that disclosed in Fig. 5. Mounted on the top 6 of this housing is an upright post 7, to the top of which is applied a sleeve 8 which is rigidly connected with one extremity of the framework of the oscillatory carriage 10. This sleeve 8 is connected by means of a screw 12 to swing freely upon the upper extremity of the post 7. This rigid framework of the oscillatory carriage includes parallel side members 13 connected at one end by an extension 14. At the extremity of the members 13 nearer the post 7 the frame is provided with an upright part 15 having spaced ears 16 at the top, in which are respectively mounted the extremities of two rods 17, the opposite extremities of these rods being secured as shown at 18, in an upright member 19 of the extension 14. Upon these rods 17 a vertically disposed yoke 20 is mounted to travel, the rods serving as guides for the yoke. This yoke has a horizontal member 21 extending in one direction from its vertical portion, its horizontal member having ears 22 which are perforated to receive the rods 17. The vertical portion of the yoke is also perforated, as shown at 23, to receive these rods, thus giving the yoke a proper bearing upon the rods for traveling purposes. The yoke is also provided with a part 24 extending downwardly below the rods and having a threaded perforation 25 to receive a feed screw 26 whose opposite extremities are journaled in the oscillatory frame as shown at 27 and 28.

The upper portion 29 of this yoke consists of a ring whose inner face is engaged by a segmental ring member 30 which is curved to conform to the curve of the ring, and slides freely therein. Upon the rotary segment 30 is mounted the clamping member 31 of the razor holder, the said member comprising a frame plate 32, below and on which are arranged and pivotally mounted as shown at 33, two members 34 and 35. These members intersect or cross each other at the pivot, and are provided with handle parts 36 and 37 extending in one direction, and jaw parts 38 and 39 extending in the opposite direction, and normally spaced by a leaf spring 40 whose extremities are formed into eyes 41 which engage pins 42, which are rigidly mounted and supported in the said jaw members and project above the same. Clamp members 43 are mounted on these pins 42 and are free to rock thereon. These clamping members are provided with faces 44 of rubber or other suitable material which come in direct contact with the shank 45 of the razor when the latter is in place.

Upon the handle members 36 and 37 of the clamp is slidably mounted a device 46 for regulating the spacing of the jaws 38 and 39 and the clamping members carried thereby. This regulating device 46 consists of a plate 47 whose body portion extends below the handles 36 and 37. This plate is provided with a slot 48 which receives a pin 49 whose upper extremity is threaded into the plate 32, this plate forming a support for the pin, which extends downwardly through the slot 48, the pin forming a guide for the controller 46 as it is moved back and forth on the handles 36 and 37. The plate 47 of this device is bent upwardly on opposite sides, forming ears 50, which extend above the handles 36 and 37 when the latter are in the horizontal position. The upper portion of the plate 47 is reinforced and apertured to receive the respective handles, whereby the controlling device is supported in place. As this device is moved toward the right, or toward the outer extremities of the handles 36 and 37, the clamping members 43 are brought closer together, whereby their rubber facings 44 are caused to grasp the shank 45 of the razor more tightly. By the employment of this controlling device, the clamping members of the razor holder may be made to accommodate themselves to razors of different sizes or razors having shanks of different thicknesses.

To the lower surface of the frame plate 32 of the razor holder is secured a reinforcing plate 51 by means of a screw 52. This reinforcing member gives the plate additional thickness and into it is threaded the upper extremity of the screw 33, forming the pivot for the two members 34 and 35 of the clamp.

Figure 7:
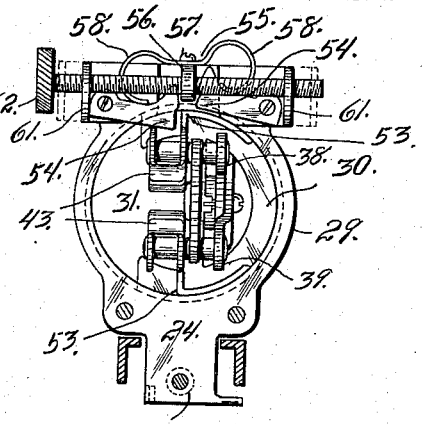
Fig. 7 is a cross section cutting the feed screw for imparting longitudinal movement to the razor holder, the section being taken on the line 7—7, Fig. 1, looking toward the right, the parts being shown on a somewhat larger scale.

Each extremity of the segmental bearing 30 which carries the razor clamp, as heretofore stated, is provided with an offset part 53, which is adapted to engage a dog 54. There are two of these dogs and they are normally forced into the path of the respective parts 53 by means of a spring 55 which is secured to a lug 56 by means of a screw 57. The opposite extremities of this spring are curved downwardly to respectively engage the two dogs 54. When the clamp is turned to a position (see Fig. 7) corresponding with the position of the razor when one of the flat sides is in contact with the rotary hone, one of the dogs 54 occupies a position directly in front of the corresponding offset or stop 53, and will prevent the further turning of the razor. As the clamp assumes the position shown in Fig. 7, the uppermost offset part or stop 53 acts upon the other dog 54, to raise the latter out of the path of the stop and against the tension of the spring member 58. When the clamp turns in the opposite direction, the same result follows, since the opposite offset or stop acts upon the other dog to lift the latter out of the way, while the previously lifted dog drops in front of the corresponding stop for the same purpose. It must be understood that the dogs 54 are pivotally mounted on angle plates 60 whose extremities 61 are provided with threaded perforations which respectively engage the right and left threaded portions of a screw 62 which is journaled in the lug 56. As this screw is turned the angle plates are caused to approach or recede from each other, as may be desired, and by virtue of this adjustment, the positions of the dogs 54 may be regulated in order to properly control the turning movement of the clamping portion of the razor holder. The angle plates 60 which carry the dogs 54 are slidably mounted upon the upper reinforced part 63 of the yoke 29 by means of T-shaped tongues 64 which are mounted on or formed integral with the respective angle plates, and engage grooves of counterpart shape formed in the parts 63 of the yoke.

Secured to the extremity of the frame plate 32, remote from the clamping members 43, is one extremity of a spindle 65. This connection is made by means of a screw 66 which is passed through the extremity 68 of the spindle, which is fitted into a slot 69 formed in the plate. By virtue of this connection, the spindle virtually forms a part or extension of the said plate. Upon this spindle is a longitudinally disposed tongue 70 which engages a groove of counterpart shape formed in the hub 71 of a segmental gear 72, whose teeth 73 engage the toothed portion 74 of a curved stationary member 75 mounted upon legs 76 extending above the top plate 6 of the base housing. The teeth 74 are arranged between parallel arcs struck from the axis of the oscillatory carriage 10, while the teeth 73 of the segmental gear 72 are arranged between arcs struck from the center or horizontal axis of the spindle 70.

Mounted upon the extremity of the spindle 70 farther from the yoke 20, is an arm 77 whose upper extremity is bifurcated to form spring arms 78 adapted to receive and hold the handle 79 of the razor 80.

From the foregoing explanation it will be understood that when the razor is in position for handling by the means of our improved machine, its shank 45 is grasped by the clamping members 43, while the handle is correspondingly supported by the spring jaws 78 of the supporting arm 77.

Now, as the carriage 10 is oscillated, the segmental gear 72 will be moved over the toothed portion 74 of the cogged rack or bar 75, and during this operation, the razor, assuming that it is in place (see dotted lines in Fig. 2), will be turned through an arc of 180 degrees or from a position having one of its flat sides in engagement with the peripheral face of the rotary hone 81, to a position where its opposite flat side is in engagement with such hone.

At the opposite extremities of the toothed or cogged rack 74, are arranged leaf springs 82, said springs being secured as shown at 83, to the legs 76 upon which the said rack is mounted. These springs extend above the rack as shown at 84, and are engaged by lips 85 with which the opposite extremities of the segmental gear 72 are provided. These lips 85 engage the parts 84 of the springs 82 just as the flat side of the razor is brought into engagement with the peripheral face of the rotary hone, and the springs serve to yieldingly maintain the razor in the proper position, their tension being sufficient for the purpose.

The framework of the oscillatory carriage curves downwardly on opposite sides as shown at 86, and these downwardly curved parts form a support for a relatively long rack 87 whose lower edge is toothed or cogged as shown at 88, to mesh with a gear 89 fast on a shaft 90 journaled in depending bearings 91 formed integral with the top plate 6 of the housing. This top plate is provided with a slot 92 through which the upper portion of the gear 89 passes in order that it may mesh with the teeth of the rack 87.

Mounted on the rack 87 and extending laterally therefrom, is a horizontally disposed plate 93 in which is journaled the lower portion of a vertically disposed shaft 94 whose upper portion is journaled in a lug 95 mounted on the front part 96 of the oscillatory carriage 10. The upper extremity of this shaft is equipped with a fast beveled gear 97 which meshes with a gear 98 fast on the screw 26. On the lower extremity of the shaft 94, which is located below the top plate 6 of the housing, is a gear 99 which is idle during the oscillatory movement of the carriage 10 in both directions. However, as the oscillatory movement ceases, this gear is brought into mesh with a coöperating gear 100 or 101, as the case may be, these last named gears being respectively mounted on shafts 102 and 103 and journaled in bearings 104 secured to the lower surface of the top plate 6 of the housing, as hereinafter more fully explained.

Arranged on opposite sides of the vertical shaft 94 are two levers designated 105 and 106, respectively. The lever 105 is fulcrumed at its upper extremity as shown at 107 on a lug 108 mounted on the front part 96 of the carriage 10, while the lever 106 is fulcrumed as shown at 109, on a similar projection 110 mounted on the part 96 of the carriage. These levers pass through slots 112 and 113, respectively formed in the plate 93, the slots extending in the direction of the axis of the screw 26, whereby the levers are permitted a limited degree of oscillation.

Pivotally connected as shown at 114 with the lever 105, is one extremity of a link 115, while the opposite extremity of the link is provided with a slot 116 through which passes a screw 117, which is threaded into the sleeve member 8 of the carriage.

When the yoke 20 traveling on the screw 26, reaches its limit of movement toward the left (see Fig. 2), its extremity 118 extending below the said screw, engages a shoulder 119 at the left hand extremity of the link 115, and moves the said link sufficiently to actuate the lower portion of the lever 105, whereby a lug 120 with which the lever is provided, acts on the free extremity 121 of an arm 122 mounted on the upper surface of the top plate 6 of the housing, and longitudinally slidable thereon by virtue of slots 123 formed in the said arm and through which screws 124 pass, the said screws being threaded into the top plate of the housing but so arranged as to allow the said arm to slide freely on said plate. As this arm is actuated or moved toward the left (see Figs. 1 and 2), a rod 125 having one extremity connected as shown at 126, with the said arm 122 is moved in the direction of the arrow in Fig. 3. The extremity of the rod 125 opposite where the rod is connected with the arm 122, is connected as shown at 127 with an upwardly projecting part 128 of a U-shaped spring 129 having arms 130 and 131, whose extremities are coiled as shown at 132, around a supporting spindle 133 made fast to the under surface of the housing plate 6 as shown at 134. The arm 131 of this spring is made fast to the housing plate or to the spindle 133, at one extremity, while its opposite extremity merges into the upright arm 128 which passes through an opening 135 formed in the housing plate. The U-shaped spring 129 has a transverse member 136 which engages the free extremity 137 of an arm 138 of a relatively long lever 139 fulcrumed on the housing plate, as shown at 140. The arm of this lever on the opposite side of the fulcrum from the arm 138, is designated 141 and its extremity 142 is turned upwardly as shown at 143 and passes through a slot 144 formed in the top plate 6. This upwardly bent extremity 143 of this lever occupies a position in the path of a projection 145 formed on the carriage 10, just before the carriage reaches the limit of its movement in the direction indicated by the arrow $a$ in Fig. 1. As the lug or projection 145 engages the part 143 of this lever, it acts to throw a pin 146 on the extremity 137 of the lever, into a short worm 148 formed on the operating shaft 149, which is journaled in bearings 150 secured to the under surface of the housing plate 6. Normally, or during the oscillatory movement of the carriage, this pin occupies a position beyond the worm 148, but by the engagement of the projection 145 of the carriage with the extremity 143 of the lever 139, the arm 138 of the lever is actuated sufficiently to bring the pin 146 into engagement with the worm, which will act upon the said lever to cause the arm 138 thereof to engage one extremity of a bar 151 in which a shaft 152 is journaled. One extremity of this shaft carries a gear 153, while its opposite extremity has a universal joint connection as shown at 154 with the shaft 90. The movement imparted to the bar 151 by the arm 138 of the lever 139 through the medium of the worm 148 and pin 146, is sufficient to disconnect the gear 153 from a gear 155 fast on the shaft 149. This operation breaks the operative connection between the shaft 90 and the operating shaft 149, whereby the gear 89 ceases to rotate and the oscillatory movement of the carriage in one direction, stops. By this time, the gear 99 has been brought into mesh with the gear 100 of the shaft 102, whereby the gear 99 together with the shaft 94 and the gear 97, are rotated, thereby imparting movement through the medium of the gear 98 to the screw 26, whereby the yoke 20 is caused to travel toward the left (see Fig. 2), and one flat face of the razor blade 80 moved longitudinally over the peripheral surface of the rotary hone 81. As soon as the yoke reaches the limit of its stroke toward the left, it acts upon the shoulder 119 of the link or connecting rod 115 and actuates the lever 105 to cause its projection 120 to engage the extremity of the arm 121 as heretofore explained, whereby the pin 146 of the lever 139 is disconnected from the worm 148, after which the lower extremity of the lever 105 acts upon a shoulder 156 of a rod 157 slidably mounted on the under surface of the housing plate, and having one extremity pivotally connected, as shown at 158 with one arm 159 of a bell crank lever 160, the said lever being fulcrumed on the plate 6 as shown at 161. The opposite arm 162 of this lever is pivotally connected as shown at 163 with one extremity of the bar 130

151, whereby, as the rod 157 is actuated by the lever 105, the bar 151 will be shifted sufficiently to throw the gear 153 into meshing relation with a gear 164 fast on the shaft 149 and a companion gear of the gear 155.

As the shaft 149 is rotating constantly during the operation of the machine, the gear 164 will impart rotary movement to the shaft 152 in a direction the reverse of the movement of this gear when in mesh with the gear 155. Consequently, the shafts 152 and 90, together with the gear 89, will be rotated in a direction to shift the oscillatory carriage 10 in the opposite direction, or the reverse of that indicated by the arrow $a$ in Fig. 1. At the same time, the gear 99 will be disconnected from the gear 100, and the longitudinal movement of the razor will cease and its turning movement will begin, and by the time the oscillatory carriage has reached its limit of movement in the direction opposite the arrow $a$ in Fig. 1, the razor will have been turned through an arc of 180 degrees, and its opposite flat side will be brought into engagement with the rotary hone 81. At the same time, the gear 99 will be brought into mesh with the gear 101 on the shaft 103, whereby rotary movement will be imparted to the gear 99, the shaft 94 and the screw 26 in the opposite direction from that employed when the gear 99 was in mesh with the gear 100, with the result that the yoke 20 will travel toward the right (see Fig. 2), and move one of the flat sides of the razor longitudinally over the rotary hone 81, until the yoke has reached its limit of movement toward the right, when a projection 165 with which the yoke 20 is equipped, will act upon the upper extremity of the lever 106 and cause a projection 166 on the lower portion of this lever, to act upon the extremity 167 of an arm 168, which is slidably mounted on the plate 6 by means of screws 169 passing through slots 170 formed in the said arm. This movement of the arm 168 which is in the direction of the arrow $c$ in Fig. 1, acts upon a rod 171 connected with the arm 168 as shown at 172, to cause the said rod to act upon a U-shaped spring 173, to disconnect a pin 174 mounted on a lever arm 175, from a worm member 178 fast on the shaft 149. The lever arm 175 is part of a lever 179 fulcrumed on the plate 6 as shown at 180, and whose opposite arm 181 is bent upwardly as shown at 184 through a slot 182 formed in the housing plate 6. Just before the oscillatory carriage reaches its limit of movement in the direction opposite the arrow $a$, Fig. 1, a projection 183 with which this carriage is provided, acts on the extremity 184 of the lever 179, and shifts the said lever sufficiently to bring the pin 174 of the lever into the worm 178, whereby the worm will move the lever sufficiently to cause its arm 175 to act upon the bar 151 to disengage the gear 153 from its coöperating gear 164, whereby the shafts 152 and 90 will cease to rotate and the oscillatory movement of the carriage will stop.

At the same time that the lever 106 actuates the arm 168 as heretofore explained, and with the result stated, the said lever also acts on a shoulder 185 of a rod 186 which is mounted on the underside of the housing plate 6 and is substantially of the same construction as the rod 157. This rod 186 is pivotally connected as shown at 187 with an arm 188 of a bell crank lever 189 fulcrumed on the underside of the plate 6 as shown at 190 and whose opposite arm 191 is pivotally connected as shown at 192 with the extremity of the bar 151 opposite that with which the arm 162 of the lever 160 is connected, as heretofore explained.

When either of the levers 139 or 179 is actuated as heretofore explained by the corresponding worm 148 or 178, of the shaft 149, to cause the bar 151 to move sufficiently to disengage the gear 153 from the gear 155 or 164 as the case may be, the said gear 153 is held in the disengaged position by virtue of the fact that the pin 146 of the lever 139 or the pin 174 of the lever 179 drops into engagement with a shoulder 193 at the inner extremity of the worm 178, whereby the actuating arm of the corresponding lever is held in contact with the bar 151 to prevent the return movement of the gear 153 into mesh with the gear from which it has been disconnected. This is necessary, since the gear 153 when so actuated to disconnect it from the gear 155 or 164 as the case may be, is at this time only moved a short distance, and would have a tendency to return into mesh with the gear from which it has been disengaged, since it is normally under spring stress to move into mesh with the one gear or the other, when the gear 153 is on either side of the center of the portion of the shaft 149 between the two gears 155 and 164, such spring stress being imparted by a rod 194, one extremity of which engages a yoke 195 as shown at 196, the said yoke being secured to the bar 151 as shown at 197, and pivotally connected with a strap 198 as shown at 199, the said strap being secured at its extremities as shown at 200, to the under side of the housing plate 6. The end of the rod 194 opposite that connected with the yoke 195 passes through an opening 201 formed in the vertical wall of the housing. Between this wall and a stop pin 202 fast on the rod 194, is located a spiral spring 203. This spring is normally under stress to move the gear 153 into mesh with the gear 155 or the gear 164, as heretofore explained, as soon as the axis of the gear 153 passes the center of the space between the gears 155 and 164 in either direction. Hence, when the gear 153 is disengaged from its gear 155 or 164 through the medium of the lever 139 or 179 and its coöperating worm, as the case may be, the movement of the gear 153 is just sufficient to break its meshing relation with the other gear, its axis still occupying a position between the center of the space between the two gears 155 and 164 and the gear from which it has been disconnected, and the gear 153 remains in this position until the longitudinal travel of the razor blade 80 over the rotary hone 81 in one direction, has been completed, and as soon as this occurs, the arm 138 of the lever 139 or the arm 175 of the lever 179 will be actuated to disengage the pin 146 or the pin 174 from one or the other shoulder 193, as the case may be, whereby the corresponding lever 139 or 179 may be returned to its normal position. At the same time, the rod 157 or the rod 186 as the case may be, is actuated and serves through the medium of the bell crank lever 160 or 189, as the case may be, to shift the gear 153 from its position as heretofore explained, into mesh with one of the gears 155 or 164. The spring-actuated rod 194 serves to securely hold the gear 153 in mesh with the coöperating gear 155 or 164, until the tension of its spring is overcome through the medium of the elements heretofore explained.

As soon as the pin 146 or 174 has been disengaged from one or the other shoulder 193 as the case may be, the oscillatory carriage begins its movement from one of its extreme positions toward its other limit of travel, and as soon as this operation begins or immediately thereafter, the projection 145 or 183 of the oscillatory carriage acts upon the upper extremity 204 of an arm 205, which is connected by means of a link 206 with the outer extremity of the arm 141 of the lever 139 or with the outer extremity of the arm 181 of the lever 179, as the case may be, whereby the said lever is returned to its normal position, or that illustrated in Fig. 5 of the drawing. Each of the arms 205 is pivotally connected at its lower extremity as shown at 207, with a depending lug 208 secured to the under side of the plate 6. This movement of the lever is aided to some extent in each case by a leaf spring 209 which is secured at one extremity as shown at 210 and acts on the lever arm 141 or 181, as the case may be in the direction of the last named movement imparted by the lug 145 or 183 of the oscillatory carriage, as the case may be. In any event, the leaf spring 209 serves in each case to maintain its lever in such normal position.

It should be explained that the pivoted arm 205 is in such position when the lug 145 or 183 approaches the upper extremity 143 or 184 as the case may be, of the lever 139 or 179, that the said lug rides over the upper extremity of such arm, but as the lug acts upon the upper extremity of the lever, it raises the arm 205 into such position that it will be engaged by the said lug when making its return movement, as heretofore explained.

Each of the shafts 102 and 103 is equipped at one extremity, being that farther toward the left in the drawings, with a beveled gear 211 which is constantly in mesh with a gear 212, the two gears 212 being located at the opposite extremities of the shaft 149. Hence, movement is imparted to the two shafts 102 and 103 as the shaft 149 is rotated, the last named shaft being rotated at all times in one direction, thus imparting rotary movement to the shafts 102 and 103 in directions which are maintained during the operation of the machine.

As illustrated in Figs. 1, 2 and 5 of the drawing, a hand crank 213 is secured as shown at 214 to a sprocket wheel 215 which is journaled as shown at 216 on a post 217 whose bottom is secured as shown at 218 to the top of the housing plate 6, the said post extending upwardly therefrom at the outer edge of the housing on one side (see Figs. 1 and 2). The sprocket wheel 215 extends beyond the housing and the hand crank 213 is secured thereto in operative relation. The wheel 215 is connected by means of a chain 219 with a similar sprocket wheel 220 which is secured as shown at 221 to one extremity of the shaft 149. Hence, as the hand crank 213 is turned, rotary movement is imparted to the shaft 149. This last named shaft is also provided with a fast gear 222 which meshes with a gear 223 fast on the lower extremity of a vertically disposed shaft 224, the gear 222 projecting upwardly through an opening 225 formed in the housing plate 6 and into meshing relation with the gear 223. The shaft 224 projects above the housing plate 6 and is journaled and supported as shown at 226 and 227. The upper extremity of the shaft 224 is equipped with a fast gear 228 which meshes with a similar gear 229 fast on a shaft 230 upon which the rotary hone 81 is mounted, being secured by a shoulder 236 on the said shaft and an adjustable sleeve 231 having one extremity engaging the rotary hone, as shown at 232, while its opposite extremity is equipped with a milled head 233. This sleeve is interiorly threaded as shown at 234 to engage a coöperating thread 235 formed on the adjacent extremity of the shaft 230. By the adjustment of this sleeve, the rotary hone may be clamped between the inner extremity of the sleeve and the shoulder 236, whereby it is secured on the shaft in operative relation for razor honing or sharpening purposes.

Figure 8:
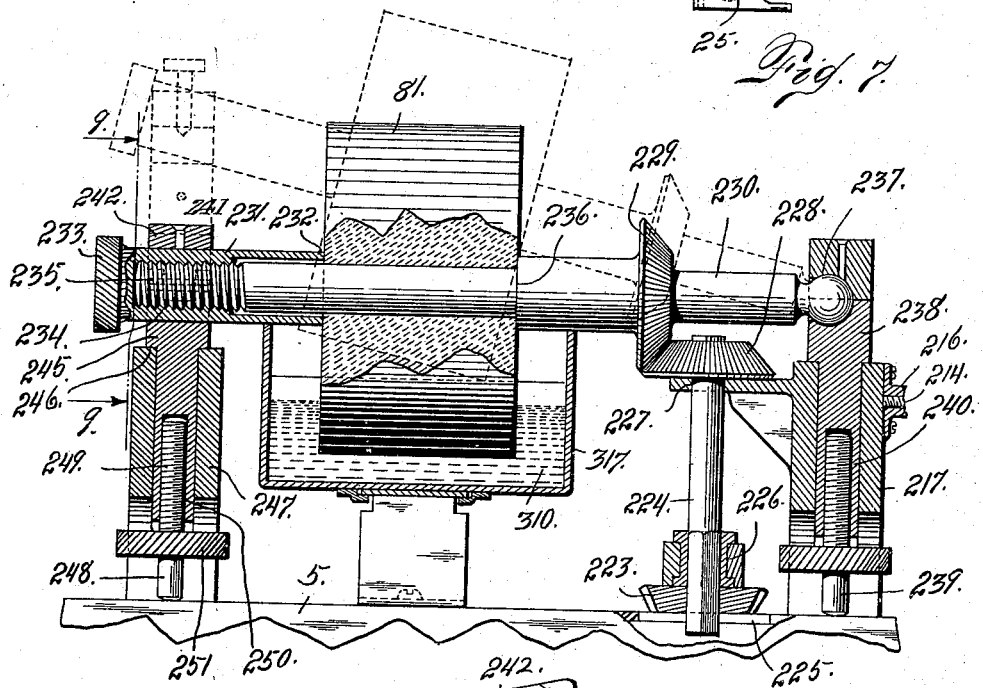
Fig. 8 is a section taken on the line 8—8, Fig. 1, and illustrating the rotary razor honing device and the parts directly connected therewith, the rotary hone being shown in two positions, the normal or operating position being shown in full lines and the inactive position in dotted lines. This view is taken on a somewhat larger scale than Figs. 1 and 2.
Figure 9:
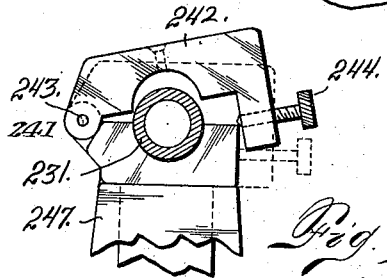
Fig. 9 is a section taken on the line 9—9, Fig. 8, looking toward the right or in the direction of the arrow adjacent said line.

The extremity of the shaft 230 remote from the sleeve 231, is journaled as shown at 237, in a vertically adjustable member 238 of the post 217, this part 238 of the post being adjustable by means of a screw 239, which is journaled in the post 217 and threaded into the part 238 as shown at 240. The extremity of the shaft 230 is journaled in the part 238 by means of a ball and socket joint, whereby the shaft may be tilted (see dotted lines in Fig. 8) when for any reason it is necessary or desirable to lift the rotary hone out of its water receptacle 317, or move the shaft and its hone out of their normal position for any purpose; and to this end, the extremity of the shaft 230 provided with the sleeve 231 is journaled in a box 241 having a member 242 hinged as shown at 243. This hinged member of the box is secured in place by a set screw 244. By loosening this set screw, the part 242 of the box may be swung outwardly (see Fig. 8), permitting the lifting of the shaft 230 to the dotted line position in Fig. 8, as just explained. The journal box 241 is vertically adjustable, whereby the clamping sleeve extremity of the shaft 230 is adapted to be raised or lowered at pleasure to correspond with the vertical adjustment of the opposite extremity of this shaft, and to this end, the box 241 is mounted on a part 245 which is shouldered as shown at 246 to engage the top of a stationary post 247 extending upwardly from the plate 6 of the housing. Journaled in this post 247 is a screw 248 having a threaded shank 249 engaging a threaded opening 250 in the depending portion of the part 245. The said screw is equipped with a relatively large milled head 251 for convenience of adjustment. By turning this screw, the vertically adjustable supporting member 245 for the journal box 241 may be raised and lowered in the same manner as the opposite extremity of the shaft is adjusted, as heretofore explained.

The construction for operating the machine through the medium of a motor is disclosed in Figs. 10, 11, 12 and 13 of the drawing. In order to provide for this manner of operation, the shaft 149 is provided at one end with an extension 252 upon which is mounted and made fast a worm wheel 253 adapted to be engaged by a worm 254 formed on a shaft 255 having a universal joint connection 256 with the armature shaft 257 of a motor 358. The worm shaft 255 is normally held out of engagement with the worm wheel 253 by means of a spiral spring 258 whose lower extremity is connected as shown at 259 with a journal box 260 through which the extremity of the work shaft remote from its connection with the motor, passes. This journal box is slidable between the spaced parallel sides 261 of an upright 262, the two parts 261 being connected at the top by a cap 263. The opposite sides of the journal box 260 are grooved as shown at 264, to receive tongues 265 which are curved to conform to an arc struck from the pivotal connection of the shaft 255 with the armature shaft of the motor. The upper extremity of the spring 258 is connected with the cap 263 of the upright 262 as shown at 266. When the worm of the worm shaft is disconnected from the worm wheel 253, the parts are in the position shown in Fig. 13. Now, if it is desired to start the machine by the use of the motor, the shaft 255 is pressed downwardly, whereby the worm 254 is brought into engagement with the teeth of the worm wheel 253. This may be accomplished by pressing downwardly on a thumb plate 267 with which the journal box 260 is equipped. As soon as the worm is in engagement with the worm wheel, a locking lever 268 and fulcrumed on the upright 262 as shown at 269, is actuated to bring its hook-shaped upper extremity 270 into engagement with the top of the journal box 260, whereby the said box, together with the shaft 256, is held in the adjusted position, the worm being in operative engagement with its worm wheel. Hence, as the motor is set in motion, the rotation of the worm shaft will operate the shaft 149 through the medium of the worm wheel 253. The lever 268 is normally held in its locking position by a leaf spring 271 which is secured at 272 to the upright 261 and acts upon a part 273 of the lever below its fulcrum. This lever is automatically disconnected from the bearing 260 for the purpose of stopping the machine by breaking the connection between the motor and the worm wheel 253. This is accomplished through the medium of a screw 274 journaled in bearings 275 suitably secured to a stationary base 276 adjacent the housing. This screw is rotated during the operation of the machine, through the medium of a spiral gear 277 fast on the extension 252 of the shaft 149, and meshing with a similar gear 278 fast on the screw 274. Mounted to engage this screw is a segmental nut 279, which engages the upper side of the screw and is normally held in contact therewith by virtue of a spring 280 which is coiled around a pin 281 carried by a block 282, one end of the spring bearing on the block as shown at 283, while the other extremity acts upon an arm 284 of a lever-like device 285, whose arm opposite the spring bearing is connected with the nut as shown at 286. The nut also carries a pointer 287 which projects over a graduated plate 288, which is provided with indicia to guide the operator in setting the pointer so that the machine may be stopped after a predetermined interval of operation. The nut 279 may be disconnected from its coöperating screw 274 by pressing downwardly on the arm 284 of the lever 285. In this event, the nut, together with the pointer and the block 282, may be freely moved on the screw, the block being equipped with an antifrictional roller 289 which engages the base 276 and facilitates the travel of the block for purposes of adjustment. This block is provided with a bifurcated collar 290, the openings of which are large enough to permit the block to travel freely on its roller 289 without interruption from the screw.

Between the traveling nut 279 and the locking lever 268, is located a device 291 which consists of two collars 292 rigidly connected by rods 293 and freely slidable in relation to the feed screw. One of the collars 292 of this slidable device 291 is located on one side of the spiral gear 278, while the other collar is located on the opposite side of the said gear or on the side nearer the lever 268. During the operation of the machine, motion is imparted to the screw 274 in a direction to cause the nut 279 and the pointer 287 carried thereby, to travel toward the left. One of the collars 292 of the slidable device 291 is normally in contact with or in close proximity to the lower arm of the lever 268. The adjustable block and the pointer are so located that by the time the nut has traveled on the screw the distance between the block and the nearer collar 292 of the slidable device 291, the machine will have operated the required period to properly sharpen the razor. As soon as this occurs, the block 282 acts upon the device 291 and moves the same toward the left and against the lower arm of the lever 268, to disengage its upper hook shaped extremity 270 from the slidable bearing 260 of the worm shaft 256. As soon as this occurs, the spring 258, being under tension as heretofore explained, will act to raise the bearing 260, together with the shaft 256, whereby its worm 254 is disconnected from the worm wheel 253. As soon as this occurs, the power from the motor is disconnected from the shaft 149, and the machine of course, will stop.

The motor circuit is so arranged through the medium of conductors 294 that one of these conductors is connected with a contact 295 and the other with a contact 296, both contacts being mounted on an insulating block 297 suitably secured to the upright 262. These contacts 295 and 296 are so spaced that a switch arm 298 which is electrically connected with the contact 295, may be moved into engagement with the contact 296 at will. In this event, the motor circuit is established and the machine will be put in operation as soon as the worm 254 is brought into engagement with the worm wheel 253 as heretofore explained.

The handle 325 of the switch arm 298, when in engagement with the contact screw 296 for closing the motor circuit, lies in the path of the worm shaft 256 as it moves upwardly out of engagement with the worm wheel 253 in response to the tension of the spring 258, whereby the switch arm is disengaged from said contact screw and the motor circuit broken. If it is desired to stop the machine without breaking the motor circuit and also stopping the motor, a switch arm 326 may be employed, which is connected at its lower extremity with the end of the contact screw 196 on the opposite side of the insulating block 297 from where the switch arm 298 is located. In this event, a contact screw 327 is passed through the insulating block, one extremity of the screw being in position to be engaged by the switch arm 298 when raised by the worm shaft 256 out of engagement with the screw 296. Now, by adjusting the switch arm 326 so that a metal part 328 which is in engagement with the screw 296 will also be in engagement with the screw 327 on the opposite side of the insulating block from the arm 298, the motor circuit will remain closed after the honing machine has ceased to operate. The switch arm 326 when not needed or when it is not desired to keep the motor circuit closed after the machine has stopped, may be moved to the dotted line position shown in Fig. 13, in which event, it is disconnected from the screw 327 and the motor circuit is broken in the same manner as if the switch arm 326 were not employed.

Again referring to the bar 151, which is actuated by the levers 160 and 189, as heretofore explained, attention is called to the fact that this bar is slidable in a support 299 which is pivotally connected with the under side of the housing plate 6, as shown at 300. This support has a slight horizontal rocking movement on the housing plate as the bar 151 is shifted back and forth for the purpose of throwing the gear 153 out of mesh with the gear 155 and into mesh with the gear 164 or vice versa. The opposite extremities of this support 299 are equipped with members 301 which carry antifrictional rollers 302, which engage the bar 151 and reduce the friction incident to its travel back and forth upon its support, as just explained.

Referring again to the operation of the rotary hone 81 upon its shaft 230, it should be explained that in order to cause the face of the hone to wear evenly when the machine is in operation, a block 303 composed of emery or other suitable material is held in engagement with the face of the hone below the travel of the razor during the reciprocating movement of either of its flat sides thereon.

For this purpose the water receptacle 317 is provided at one extremity with upper and lower flanges 304 suitably spaced to receive the block 303. Between the peripheral face of the stone 81 and one end of the water receptacle, there is sufficient space to receive the block 303 which, however, is engaged by a U-shaped clip 305 whose arms pass through openings formed in the upper part of the water receptacle and are bent outwardly in opposite directions as shown at 306 to engage one side of the block 303 in opposing relation to the rotary hone 81. This clip 305 is perforated at one end to receive a screw 307 which is rigidly secured to the adjacent extremity of the water receptacle between the parallel arms of the clip. Threaded on this screw is a nut 308 which acts upon a spiral spring 309 located between the nut and the closed extremity of the clip. As this nut is turned in the proper direction, the spring is placed under tension and caused to act upon the clip, which in turn presses upon the block 303 and forces it against the face of the hone 81, with the necessary power to accomplish the aforesaid purpose.

From the foregoing description, the use and operation of our improved machine will be readily understood, but for better understanding of the various operations in their proper sequence, a brief description of the same will now be given.

Whether the machine is operated by the motor or by hand, motion is communicated to the main shaft 149 of the machine. From this shaft, motion is transmitted to the shaft 230 carrying the rotary hone, whereby the latter is operated. As there is a quantity of water 310 within the water receptacle 317, the rotary hone 81 can be continually moistened to prevent an undue rise in temperature.

By virtue of the gearing connections between the shaft 149 and the two shafts 102 and 103, the latter are constantly in motion and in opposite directions during the operation of the machine. Also the gears 155 and 164 of the shaft 149 are constantly in operation. Assuming that the gear 153 which is fast on the shaft 152, is in mesh with the gear 164, the shaft 152 will be rotating the gear 89 to cause the oscillatory carriage to travel in a direction opposite the arrow a in Fig. 1. As shown in Fig. 5, this carriage has already completed one-half of its travel in said direction. As the carriage approaches the limit of its oscillatory movement in the said direction, its projection 183 will pass over the upper extremity 204 of the arm 205, and engage the up-turned extremity 184 of the lever 179 and act upon the said lever to cause its pin 174 to engage the worm 178 of the shaft 149. The action of this worm upon the pin will move the lever in the proper direction to actuate the bar 151 sufficiently to disconnect the gear 153 from the gear 164. As soon as this occurs, the shaft 152 together with its connections will cease to operate and the oscillatory movement of the carriage will stop. At the same time that the carriage ceases its oscillatory movement, the gear 99 carried by the vertical shaft 94 will be brought into mesh with the gear 101 of the shaft 103, and the rotary action imparted to the shaft 94 will actuate the gear 97, which, meshing with the gear 98, will operate the screw 26 and cause the yoke 20 to travel toward the right on said screw (see Fig. 2). During this travel, the flat face of the razor 80 is in contact with the rotary hone 81 and is caused to move longitudinally thereon the entire length of the blade. As the yoke reaches its limit of travel toward the right (see Fig. 2), its projection 165 acts upon the upper extremity of the lever 106, to cause the said lever to act simultaneously upon the arm 168 and the rod 186. The movement of the arm 168 serves through the medium of the rod 171, to actuate the U-shaped spring 173 to disconnect the pin 174 of the lever 179 from the shoulder 193 of the worm 178. At the same time, the lever 106 acts upon the rod 186 to throw the gear 153, through the medium of the lever 189, into mesh with the gear 155, and the oscillatory carriage immediately begins its travel in the reverse direction, or that of the arrow a, Fig. 1. By virtue of the action of the projection 183 of the carriage upon the upper extremity 184 of the lever 179, the upper extremity 204 of the arm 205 has been raised into the path of the projection 183. Hence, practically as soon as the carriage begins its return movement, the projection 183 acts upon the upper extremity of the arm 205 and moves the latter sufficiently to actuate the lever 179 through the medium of the link 206, to return the said lever to its normal position, or on the opposite side of the worm 178 from the shoulder 193, or to the position shown in Fig. 5. As the carriage continues to travel in the direction of the arrow a, in Fig. 1, its projection 145, as the carriage approaches its limit of travel, will pass over the upper extremity 204 of the corresponding opposite arm 205, and engage the up-turned extremity 143 of the lever 139, and actuate the said lever to cause its pin 146 to enter the worm 148 with the result that the said lever will be actuated to cause its arm 138 to act upon the adjacent extremity of the bar 151, to disengage the gear 153 from the gear 155 and the lever will be held in this position by virtue of the fact that its pin 146 will drop into engagement with the shoulder 193 of the worm 148. As soon as this occurs, the oscillatory movement of the carriage will stop by virtue of the explanation heretofore given, and the gear 99 will be brought into engagement with the gear 100 of the shaft 102, whereby, the vertical shaft 94 will be rotated to operate the screw 26 through the medium of the gears 97 and 98 in a direction to cause the yoke 20 to travel toward the left (see Fig. 2). As the yoke 20 reaches the limit of its travel toward the left, its lower extremity acts upon the shoulder 119 of the link or connecting rod 115 and moves the said rod sufficiently to actuate the lever 105 and cause the same to act simultaneously upon the arm 122 and the rod 157, to impart longitudinal movement thereto. The movement of the arm 122 through the medium of the rod 125, serves, in connection with the U-shaped spring 129, to lift the arm 138 of the lever 139 to disengage the pin 146 from the shoulder 193 of the worm 148, whereby the said lever is adjusted to permit its return to its normal position. The aforesaid movement of the rod 157 imparted by the lever 105, will serve, through the medium of the bell crank lever 160, to actuate the bar 151 sufficiently to throw the gear 153 into mesh with the gear 164 or to the position assumed at the beginning of the description of the operation. The action of the gear 164 on the gear 153, will cause the oscillatory carriage to travel in the direction opposite the arrow a, Fig. 1, and the lug 145 of the carriage will act upon the upper extremity 204 of the corresponding arm 205, whereby, the lever 139 will be returned to its normal position; and the movement of the carriage will continue and the operation heretofore described will be repeated.

It should be explained that each of the levers 105 and 106 is normally held in its inactive position by virtue of leaf springs 312 and 313, which are respectively connected with the said levers by means of links 315 and 316. The normal position of the lever 105 is shown in Fig. 2, and the corresponding position of its spring 312. From this, it will be understood that as the yoke 20 begins its return travel from its position at either end of the screw 26, the actuated lever 105 or 106 as the case may be, will be released and its spring 312 or 313 will return to its normal position, whereby the arm 122 or 168 will also be returned to its normal position, and the spring 129 or 173 as the case may be, will be released and moved downwardly to its normal position, whereby the lever arm 138 or 175 will assume its normal position, and the pin 146 or 174 will be ready to enter the worm 148 or 178, as occasion may require. It will be understood that the rods 157 and 186 are returned to their normal positions in time to be acted on by the levers 105 and 106, respectively, as the bar 151 is shifted in the one direction or the other. For instance, as the bar 151 is shifted to the position shown in Fig. 5 through the action of the rod 157, the rod 186 is returned to its normal position by virtue of the corresponding movement imparted to the bell crank lever 189 with which it is connected. In the same manner, the rod 157 is returned to its normal position as the rod 186 serves to move the bar 151 to its limit of movement in the opposite direction.

Mounted on the housing plate adjacent the portion of the oscillatory carriage carrying the cog rack 87, is a pair of horizontally disposed rollers 318 adapted to engage from above horizontally disposed flanges 319 with which the carriage is provided. These flanges, in conjunction with the said rollers, serve to maintain the carriage in its proper position, whereby the gear 89 engages the same in proper coöperative relation. This function is further accomplished by means of a centrally located vertically disposed roller 320 which engages a narrow ledge or flange 321 formed on the central portion of the carriage. This central roller also engages the flanges 319 as the carriage approaches its limit of oscillating movement in either direction. The roller 320 is mounted on an angle bracket 322 which is secured to the top of the housing plate 6; while the rollers 318 are mounted on small blocks 323 which are also secured at the top of the housing plate by means of suitable fastening devices.

Having thus described our invention, what we claim is,—

1. In a razor honing machine, having a main drive shaft the combination of an oscillatory carriage, adapted to be intermittently driven thereby, a razor-holder mounted thereon, a gear connected with the holder and movable with the carriage, a stationary rack engaging the gear for turning the razor-holder, and means operated by the main shaft for moving the razor-holder back and forth on the carriage, said means operating independently of the oscillatory travel of the carriage.

2. In a razor honing machine, having a main drive shaft, the combination of a carriage, a razor-holder mounted thereon, means coupled to the main drive shaft for imparting an oscillatory movement to the carriage, means for turning the razor-holder as the carriage oscillates, and separate means coupled with the main drive shaft for moving said razor-holder longitudinally of the carriage said means operating independently of the oscillatory travel of the carriage.

3. In a razor honing machine, having a main drive shaft, the combination of a carriage, a razor-holder mounted thereon, means coupled with the driving shaft adapted to move said carriage through the arc of a circle in one direction and automatically stop the carriage, means for turning the razor-holder on its axis during the arcuate movement of the carriage, and means operating automatically through said main drive shaft for imparting a longitudinal movement to the razor-holder when the carriage is stopped at the end of its arcuate travel, 4. In a razor honing machine, the combination of an oscillatory carriage, a razor-holder rotatably mounted thereon, means engaging the said holder for automatically imparting rotary movement thereto as the carriage oscillates in either direction, and means for moving the holder longitudinally of the carriage, said last mentioned means operating independently of the oscillatory travel of the carriage and only when the carriage is stationary at either end of its path of travel.

5. In a razor honing machine, the combination of an oscillatory carriage, a razor holder rotatably mounted thereon, means engaging the said holder for automatically imparting rotary movement thereto as the carriage oscillates in either direction, said means including a gear and a coöperating rack, one of said elements being fast on the razor-holder and the other being stationary, and means for reciprocating the razor-holder on the carriage, said last mentioned means operating independently of the carriage oscillating means and only when the latter is in inoperative or disconnected position.

6. In a razor honing machine, the combination with a support and a hone, of a carriage mounted to oscillate on the support adjacent the hone, a razor holder mounted on the carriage to have both rotary and longitudinal movement, means for imparting the oscillatory travel to the carriage, means for automatically imparting rotary movement to the razor holder in reverse directions during each oscillation of the carriage, means for automatically interrupting the travel of the carriage at the end of each stroke, and means for subsequently imparting the longitudinal movement to the razor holder to cause the razor carried by the razor holder to be moved in contact with the hone.

7. In a razor honing machine, the combination with a base and a hone mounted thereon, of a carriage mounted to oscillate on the base adjacent the hone, means for imparting oscillatory travel to the carriage, means for automatically breaking the connection between the carriage and the said operating means at the end of each stroke of the oscillation, a razor holder carried by the carriage and mounted to have both rotary and longitudinal travel, means for automatically imparting the rotary movement to the razor holder in reverse directions during the oscillation of the carriage, and means for automatically imparting the longitudinal movement to the razor holder independently of the oscillatory travel of the carriage, whereby the razor carried by the holder is moved in contact with the hone.

8. A razor honing machine comprising an oscillatory carriage, a razor holder mounted on the carriage to have both rotary movement and movement in the direction of its axis of rotation, means engaging the holder for automatically imparting the rotary movement thereto as the carriage oscillates, and means for imparting to the razor holder movement in the direction of its axis of rotation, said last named means including a feed screw and a nut on the razor holder engaging said screw.

9. A razor honing machine including a base, a carriage mounted to oscillate thereon, a razor holder mounted on the carriage to have both rotary movement and movement in the direction of its axis of rotation, means for imparting rotary movement to the holder during the oscillatory travel of the carriage in either direction, and means for imparting the longitudinal movement to the razor holder, said means including a feed screw, a nut mounted on the razor holder and engaging said screw, and means for imparting rotary movement to the screw at properly timed intervals.

10. A razor honing machine including a base, a carriage mounted to oscillate thereon, a razor holder mounted on the carriage to have both rotary movement and movement in the direction of its axis of rotation, means for imparting rotary movement to the holder during the oscillatory travel of the carriage in either direction, and means for imparting the longitudinal movement to the razor holder, said means including a feed screw, a nut mounted on the razor holder and engaging said screw, and means for imparting rotary movement to the screw in reverse directions.

11. The combination with a support, of a carriage mounted to oscillate thereon, a shaft journaled therein, means for rotating the shaft constantly in one direction, a second shaft, a gearing connection between the second shaft and the first shaft for imparting rotary movement to the second shaft in reverse directions, a gearing connection between the second shaft and the carriage for imparting the oscillatory travel to the latter, and means for automatically changing the connection between the two shafts at the end of each stroke of the oscillation of the carriage for reversing the travel of the latter.

12. The combination of an oscillatory carriage, an operating shaft, means for rotating the shaft, similar spaced gears mounted on the said shaft, a second shaft having a gear at one extremity, the second shaft being journaled to permit adjustment to bring its gear into mesh with either of the gears on the operating shaft for reversing the rotation of the second shaft, the latter having a gear at its extremity remote from the operating shaft, a rack on the carriage which the last named gear engages, means for automatically breaking the connection between the gear of the second shaft and the first gear of the operating shaft at the end of each stroke of the carriage, and means for automatically moving the last named gear of the second shaft from its disconnected position, into mesh with the second gear of the operating shaft.

13. The combination of a main shaft, two companion shafts spaced from each other and operated from the main shaft to rotate in reverse directions, each of the companion shafts having a gear remote from the operating shaft, a screw journaled to rotate in either direction, a razor holder mounted to travel longitudinally of the screw, an oscillatory carriage upon which the screw is mounted, means for oscillating the carriage, a gear mounted on the carriage, connected in operative relation with the said screw and arranged to alternately mesh with the said gears of the companion shafts as the carriage reaches the limit of its stroke in opposite directions.

14. The combination of a main shaft, two companion shafts spaced from each other and operated from the main shaft to rotate in reverse directions, each of the companion shafts having a gear remote from the operating shaft, a screw journaled to rotate in either direction, a razor holder mounted to travel longitudinally of the screw, an oscillatory carriage upon which the screw is mounted, means for oscillating the carriage, a gear mounted on the carriage connected in operative relation with the said screw and arranged to alternately mesh with the said gears of the companion shafts as the carriage reaches the limit of its stroke in opposite directions, means for automatically stopping the travel of the carriage as the gear carried thereby rides into mesh with the gear of either companion shaft, and means for subsequently and automatically imparting the reverse movement to the carriage.

15. A razor honing machine including a hone, a razor holder, an oscillatory carriage upon which the razor holder is mounted to rotate and in suitable proximity to bring the razor into contact with the hone, a main shaft carrying two spaced gears fast thereon, a second shaft carrying a gear located between the two gears of the operating shaft, the second shaft being adjustable to bring such gear into mesh with either of the gears of the operating shaft, whereby the second shaft may be caused to travel in reverse directions, an operative connection between the second shaft and the carriage for oscillating the latter when the gear of the second shaft is in mesh with either of the gears of the main shaft, and means for automatically throwing the gear of the second shaft alternately into mesh with the two gears of the main shaft for moving the carriage back and forth or imparting the reciprocating movement necessary to oscillation.

16. The combination of an oscillatory carriage, a razor holder mounted to rotate thereon, means for automatically rotating the holder to cause it to travel approximately 180 degrees in reverse directions during the oscillation of the carriage, a main shaft carrying two spaced gears, a second shaft carrying a gear at each extremity, the gear at one extremity of the second shaft meshing with a cogged rack on the carriage for imparting the oscillatory travel to the latter, the gear at the opposite extremity of the second shaft being located between the two gears of the main shaft, the second shaft being jointed to allow the gear located between the gears of the main shaft to move out of mesh with the other gear, means for automatically shifting the oscillatory gear of the second shaft out of mesh with one of the gears of the main shaft as the carriage reaches its limit of oscillation in either direction, and means for subsequently and automatically shifting the said oscillating gear into mesh with the gear of the main shaft other than that with which it was last in mesh and reversing the travel of the carriage after it is stopped at the limit of its stroke in either direction.

17. The combination of an oscillatory carriage, a razor holder mounted to rotate thereon, means for automatically rotating the said holder to cause it to travel approximately 180 degrees in reverse directions during the oscillation of the carriage, a main shaft carrying two spaced gears, a second shaft carrying a gear at each extremity, the gear at one extremity meshing with a cogged rack on the carriage for imparting the oscillatory movement to the latter, the gear at the other extremity of the second shaft being located between the two gears of the main shaft and adjustable to mesh with either gear, the second shaft being jointed for the purpose, means for automatically shifting the oscillatory gear of the second shaft out of mesh with one of the gears of the main shaft as the carriage reaches its limit of oscillation in either direction, said means including a lever having a pin on one arm, a worm carried by the main shaft and a projection on the carriage arranged to act on the opposite arm of the lever for throwing the pin into the worm.

18. The combination of an oscillatory carriage, a razor holder mounted to rotate thereon, means for automatically rotating the holder to cause it to travel approximately 180 degrees in reverse directions during the oscillation of the carriage, a main shaft carrying two spaced gears, a second shaft carrying a gear at each extremity, the gear at one extremity meshing with the cogged rack of the carriage for imparting the oscillatory movement to the latter, the gear at one extremity of the second shaft being located between the two gears of the main shaft and adjustable to mesh with either, the second shaft being jointed for the purpose, means for automatically shifting the oscillatory gear of the second shaft out of mesh with one of the gears of the main shaft as the carriage reaches its limit of oscillation in either direction, and means for subsequently and automatically shifting the said oscillatory gear into mesh with the gear of the main shaft other than that with which it was last in mesh, for reversing the travel of the carriage after it is stopped at the limit of its oscillatory travel in either direction, said means including an oscillatory bar in which the oscillating portion of the second shaft is journaled, a bell crank lever connected with one end of the said bar and a rod for actuating the lever.

19. A razor honing machine comprising an oscillatory carriage, a razor holder mounted thereon to have both longitudinal and rotary travel, means for automatically imparting rotary movement to the razor holder in reverse directions as the carriage oscillates, means for subsequently imparting longitudinal travel in reverse directions at the ends of the oscillatory strokes of the carriage, means for automatically imparting the oscillatory movement to the carriage, including a rack on the carriage, a gear meshing with said rack, a shaft upon which said last named gear is mounted, said shaft having a jointed member, a second gear fast on the jointed member of said shaft, a main shaft having two spaced gears between which said second gear is located, a reciprocable bar through which the jointed member of said shaft passes, bell crank levers having arms respectively connected with the opposite ends of said bar, and actuating rods respectively connected with the opposite arms of said levers.

20. In a razor honing machine, the combination of an oscillatory carriage carrying a toothed rack, a gear engaging said rack for directly imparting travel to the carriage in reverse directions as the gear is correspondingly rotated, a jointed shaft upon one member of which the said gear is mounted, a second gear mounted on the other member of the shaft, an oscillatory bar in which the last named shaft member is journaled, an operating shaft having two spaced gears between which the said second gear of the first named shaft is located and with which it is adapted to mesh for imparting the oscillatory travel to the carriage, levers arranged at the opposite ends of the said oscillatory bar, each lever having one arm provided with a pin and another arm in the path of the carriage as it approaches its limit of travel, whereby the said levers are alternately actuated to cause their pins to respectively engage the worms of the operating shaft, the said worms serving to actuate their lever arms to cause them to alternately move the said oscillating bar a sufficient distance to disengage the gear of the second shaft from either spaced gear of the operating shaft.

21. In a razor honing machine, the combination of an oscillatory carriage carrying a toothed rack, a gear engaging said rack for directly imparting travel to the carriage in reverse directions as the gear is correspondingly rotated, a jointed shaft upon one member of which the said gear is mounted, a second gear mounted on the other member of the shaft, an oscillatory bar in which the last named shaft member is journaled, an operating shaft having two spaced gears between which the said second gear of the first named shaft is located and with which it is adapted to mesh for imparting the oscillatory travel to the carriage, levers arranged at the opposite ends of the said oscillatory bar, each lever having one arm provided with a pin and another arm in the path of the carriage as it approaches its limit of travel, whereby the said levers are alternately actuated to cause their pins to respectively engage the worms of the operating shaft, the said worms serving to actuate their lever arms to cause them to alternately move the said oscillating bar a sufficient distance to disengage the gear of the second shaft from either spaced gear of the operating shaft, each worm of the operating shaft having a shoulder at its extremity nearer the said bar, which the pin of the corresponding lever engages to hold the lever in the adjusted position.

22. In a razor honing machine, the combination of an oscillatory carriage carrying a toothed rack, a gear engaging said rack for directly imparting travel to the carriage in reverse directions as the gear is correspondingly rotated, a jointed shaft upon one member of which the said gear is mounted, a second gear mounted on the other member of the shaft, an oscillatory bar in which the last named shaft member is journaled, an operating shaft having two spaced gears between which the said second gear of the first named shaft is located and with which it is adapted to mesh for imparting the oscillatory travel to the carriage, levers arranged at the opposite ends of the said oscillatory bar, each lever having one arm provided with a pin and another arm in the path of the carriage as it approaches its limit of travel, whereby the said levers are alternately actuated to cause their pins to respectively engage the worms of the operating shaft, the said worms serving to actuate their lever arms to cause them to alternately move the said oscillating bar a sufficient distance to disengage the gear of the second shaft from either spaced gear of the operating shaft, each worm of the operating shaft having a shoulder at its extremity nearer the said bar, which the pin of the corresponding lever engages to hold the lever in the adjusted position, means for automatically disengaging the said pins of the levers from the worms of the operating shaft while the carriage is at its opposite limits of movement, and means connected with the said levers and actuated by the carriage for returning the pin extremities of the said lever arms to their normal positions at the opposite extremities of the worms.

23. The combination of an oscillatory carriage, a screw carried thereby, a razor holder mounted on the screw to travel longitudinally thereof in either direction, an operating shaft having two spaced gears, a second shaft having a gear at one extremity arranged between the spaced gears of the operating shaft and adjustable to mesh with either for imparting the oscillatory travel to the carriage which is connected in operative relation with the second shaft, levers arranged to be respectively actuated by the razor holder as it reaches its limits of travel at the opposite ends of the screw, and an operative connection between said levers and the gear of the second shaft, whereby the latter is alternately shifted into meshing relation with the gears of the operating shaft.

24. The combination of an oscillatory carriage, a screw carried thereby, a razor holder mounted on the screw to travel longitudinally thereof in either direction, an operating shaft having two spaced gears, a second shaft having a gear at one extremity arranged between the spaced gears of the operating shaft and adjustable to mesh with either for imparting the oscillatory travel to the carriage which is connected in operative relation with the second shaft, levers arranged to be respectively actuated by the razor holder as it reaches its limits of travel at the opposite ends of the screw, and an operative connection between said levers and the gear of the second shaft, whereby the latter is alternately shifted into meshing relation with the gears of the operating shaft, worms on the operating shaft, levers engaging said worms and actuated thereby for disengaging the gear of the second shaft from the gears of the operating shaft, and an operative connection between the said first named levers and the second named levers for disengaging the first levers from the said worms.

In testimony whereof we affix our signatures in presence of two witnesses.

JOHN KAYETAN.
HENRY EVENSON.

Witnesses:
A. J. O'BRIEN,
A. EBERT O'BRIEN.

Copies of this patent may be obtained for five cents each, by addressing the "Commissioner of Patents, Washington, D. C."